United States Patent
Barcon et al.

(10) Patent No.: US 11,506,486 B2
(45) Date of Patent: Nov. 22, 2022

(54) LASER ALIGNMENT SYSTEM FOR A LAMP MOUNTING BRACKET

(71) Applicant: The Boeing Company, Chicago, IL (US)

(72) Inventors: David Barcon, Mill Creek, WA (US); John R Hansen, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 493 days.

(21) Appl. No.: 16/748,263

(22) Filed: Jan. 21, 2020

(65) Prior Publication Data
US 2021/0223033 A1  Jul. 22, 2021

(51) Int. Cl.
*G01B 11/27* (2006.01)
*B64D 47/04* (2006.01)

(52) U.S. Cl.
CPC .............. *G01B 11/27* (2013.01); *B64D 47/04* (2013.01)

(58) Field of Classification Search
CPC .... G01B 11/27; G01B 11/2755; B64D 47/04; B64D 43/00; G01M 11/061; G01M 11/062; B64F 5/60; B64F 5/40; B64B 1/005; G01C 15/004
See application file for complete search history.

(56) References Cited

U.S. PATENT DOCUMENTS

| | | |
|---|---|---|
| 4,804,265 A | 2/1989 | Baukol et al. |
| 7,456,949 B2 * | 11/2008 | Somani ............... A61F 9/00802 |
| | | 250/252.1 |
| 7,652,761 B2 * | 1/2010 | Somani ................ B23K 26/705 |
| | | 250/252.1 |
| 8,104,925 B2 | 1/2012 | Gordin |
| 9,605,951 B2 * | 3/2017 | Hölzl ...................... G01B 11/14 |
| 9,669,944 B2 * | 6/2017 | Gagnon ................. B64D 47/04 |
| 9,751,638 B1 * | 9/2017 | Gagnon ................. B64D 47/02 |
| 2005/0215986 A1 * | 9/2005 | Chernyak ............ B23K 26/705 |
| | | 356/10 |
| 2007/0225692 A1 * | 9/2007 | Somani ................. G01J 1/4257 |
| | | 250/252.1 |

(Continued)

FOREIGN PATENT DOCUMENTS

WO   2015035893 A1   3/2015

OTHER PUBLICATIONS

EP, Extended Search Report, Application No. 20209542.8, pp. 2-4, dated May 5, 2021.

*Primary Examiner* — Yaritza Guadalupe-McCall
(74) *Attorney, Agent, or Firm* — Vivacqua Crane, PLLC

(57) ABSTRACT

A laser alignment system for adjusting a mounting bracket of a lamp is disclosed. The laser alignment system includes an alignment bracket including a body portion defining one or more target features and a plurality of index features. The one or more target features include a target that is configured to align with a laser beam and the plurality of index features that are configured to position the alignment bracket along a surface. The laser alignment system also includes a laser alignment tool including a base, a mount, and a laser device. The mount holds the laser device in place and the laser device is configured to emit the laser beam, and the base of the laser alignment tool is shaped to fit within the mounting bracket for the lamp and the laser device directs the laser beam towards a corresponding one of target features of the alignment bracket.

20 Claims, 10 Drawing Sheets

(56) References Cited

U.S. PATENT DOCUMENTS

| | | |
|---|---|---|
| 2008/0165414 A1 | 7/2008 | Gray |
| 2009/0076487 A1* | 3/2009 | Somani ................. G01J 1/4257 606/5 |
| 2011/0267446 A1* | 11/2011 | Chernyak ........... A61F 9/00802 348/78 |
| 2016/0223320 A1* | 8/2016 | Hölzl .................. G01B 11/272 |
| 2017/0128260 A1* | 5/2017 | Chernyak ............ B23K 26/705 |
| 2021/0223033 A1* | 7/2021 | Barcon ................. B64D 47/04 |

* cited by examiner

LASER ALIGNMENT SYSTEM FOR A LAMP MOUNTING BRACKET

The present disclosure relates to a laser alignment system for a lamp mounting bracket. More particularly, the present disclosed is directed towards a laser alignment system including an alignment bracket and a laser alignment tool, where the mounting bracket includes a target that aligns with a laser beam generated by the laser alignment tool.

BACKGROUND

An aircraft is equipped with landing lights for illuminating the terrain and runway ahead during takeoff and landing. The aircraft may also include runway turnoff lights, which are often installed on the leading edges of the wings. The runway turnoff lights are used to illuminate high-speed runway exits as the aircraft decelerates during landing.

The landing and the runway turnoff lights require very precise installation accuracy. Thus, if there is even a relatively small deviation in the installation angle of the brackets that hold the landing light, this may result in insufficient lighting in the area in front of the aircraft. During assembly of the aircraft, the brackets that hold the landing and the runway turnoff lights are aligned using a laser tool.

The alignment process becomes especially time consuming and labor intensive when performed with the airplane on wheels instead of at a manufacturing facility. This is because the brackets that hold the landing lights are high above the ground and may only be reached by lifting personnel up into the air using machinery, such as a hi-lift. For example, one type of aircraft requires four individuals working for about sixteen hours to align the landing and runway turnoff lights.

SUMMARY

According to several aspects, a laser alignment system for adjusting a mounting bracket of a lamp is disclosed. The laser alignment system includes an alignment bracket including a body portion defining one or more target features and a plurality of index features. The one or more target features include a target that is configured to align with a laser beam and the plurality of index features that are configured to position the alignment bracket along a surface. The laser alignment system also includes a laser alignment tool including a base, a mount, and a laser device. The mount holds the laser device in place and the laser device is configured to emit the laser beam, and the base of the laser alignment tool is shaped to fit within the mounting bracket for the lamp and the laser device directs the laser beam towards a corresponding one of target features of the alignment bracket.

In another aspect, a laser alignment system for aligning exterior aircraft lighting disposed along a leading edge of a wing of an aircraft is disclosed. The laser alignment system includes an alignment bracket including a body portion defining one or more target features, a plurality of index features, and an outer perimeter. The one or more target features include a target that is configured to align with a laser beam, and the plurality of index features that are configured to position the alignment bracket along a leading edge of the wing of the aircraft, and the outer perimeter of the alignment bracket is shaped to an opening surrounding an exterior landing light disposed along the leading edge of the wing. The laser alignment system also includes a laser alignment tool including a base, a mount, and a laser device. The mount holds the laser device in place and the laser device is configured to emit the laser beam, and the base of the laser alignment tool is shaped to fit within a mounting bracket for a lamp disposed along the leading edge of the wing, and the laser device directs the laser beam towards a corresponding one of target features of the alignment bracket.

In still another aspect, a method for aligning a mounting bracket corresponding to a lamp disposed along a leading edge of a wing of an aircraft is disclosed. The method includes placing a base of a laser alignment tool within the mounting bracket corresponding to the lamp, where the laser alignment tool includes a laser device configured to emit a laser beam. The method includes positioning an alignment bracket in place around an opening disposed along the leading edge of the wing of the aircraft. The method also includes directing the laser beam emitted by the laser device towards a corresponding target feature of the alignment bracket. The corresponding target feature of the alignment bracket includes a target configured to align with the laser beam emitted from the laser device when the mounting bracket is in a correct installation position. Finally, the method includes adjusting the mounting bracket that holds the laser alignment tool in place until the laser beam emitted by the laser device aligns with the target of the corresponding target feature of the alignment bracket.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a laser alignment system for adjusting a mounting bracket of a lamp. The laser alignment system includes an alignment bracket having a body portion defining one or more target features and a plurality of index features, where the target features each include a target that is configured to align with a laser beam. The index features that are configured to position the alignment bracket along a surface. The laser alignment system also includes a laser alignment tool having a base, a mounting, and a laser device. The mounting of the laser alignment tool holds the laser device in place, and the laser device is configured to emit the laser beam. The base of the laser alignment tool is shaped to fit within the mounting bracket of the lamp, and the laser device directs the laser beam towards a corresponding one of target features of the alignment bracket.

An individual adjusts the mounting bracket of the lamp until the laser beam is aligns with the target defined by a pair of crosshairs that are part of a corresponding one of the target features of the alignment bracket. The disclosure also includes a method for aligning a mounting bracket using the disclosed laser alignment system. It is to be appreciated that the alignment bracket of the disclosed laser alignment system is relatively lightweight and compact in size, and therefore is portable. In other words, an individual is able to carry the alignment bracket. The laser alignment tool is also relatively lightweight, and is battery powered. Therefore, the laser alignment tool is also portable as well.

The following description is merely exemplary in nature and is not intended to limit the present disclosure, application, or uses.

Figure 1:
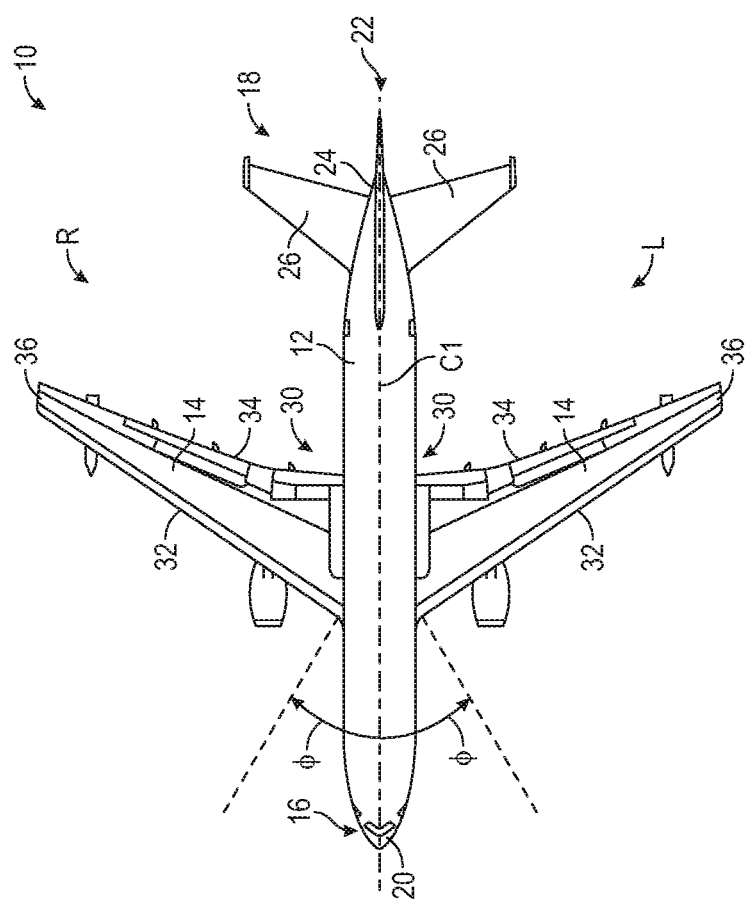
FIG. 1 is a plan view of an exemplary aircraft that employs the disclosed laser alignment system, according to an exemplary embodiment.
Figure 2:
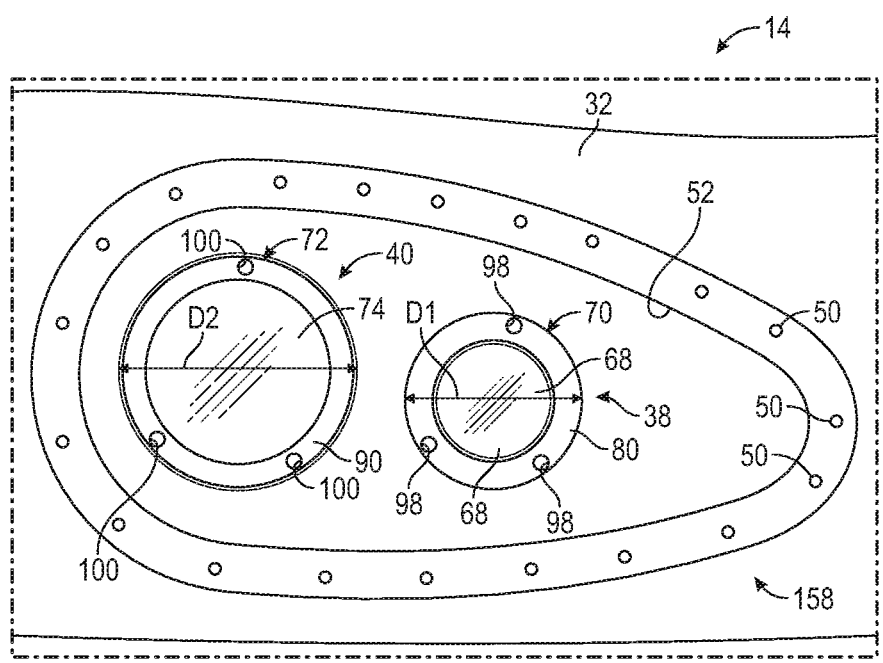
FIG. 2 is a front view of a landing light and a runway turnoff light located along a leading edge of one of the wings of the aircraft shown in FIG. 1, according to an exemplary embodiment.

Referring to FIG. 1, a plan view of an aircraft 10 is shown. The aircraft 10 includes a fuselage 12 and a pair of wings 14. A nose 20 is located at a forward end 16 of the aircraft 10 and an empennage 22 is located at an aft end 18 of the aircraft 10. The empennage 22 of the aircraft 10 includes a vertical stabilizer 24 as well as a horizontal stabilizer 26. The wings 14 of the aircraft 10 extend outwardly from opposing sides 30 of the fuselage 12. Each wing 14 of the aircraft 10 defines a leading edge 32, a trailing edge 34, and a wing tip 36. The aircraft 10 also includes a pair of runway turnoff lights 38 (one of which is shown in FIG. 2) as well as a pair of landing lights 40 (one of which is also shown FIG. 2), where one of the runway turnoff lights 38 and one of the landing lights 40 are installed on the leading edge 32 of each wing 14. As explained below, a laser alignment system 42 (FIG. 3) is provided to align the exterior aircraft lighting disposed along one of the wings 14 of the aircraft 10 (i.e., the runway turnoff lights 38 and the landing lights 40).

Figure 3:
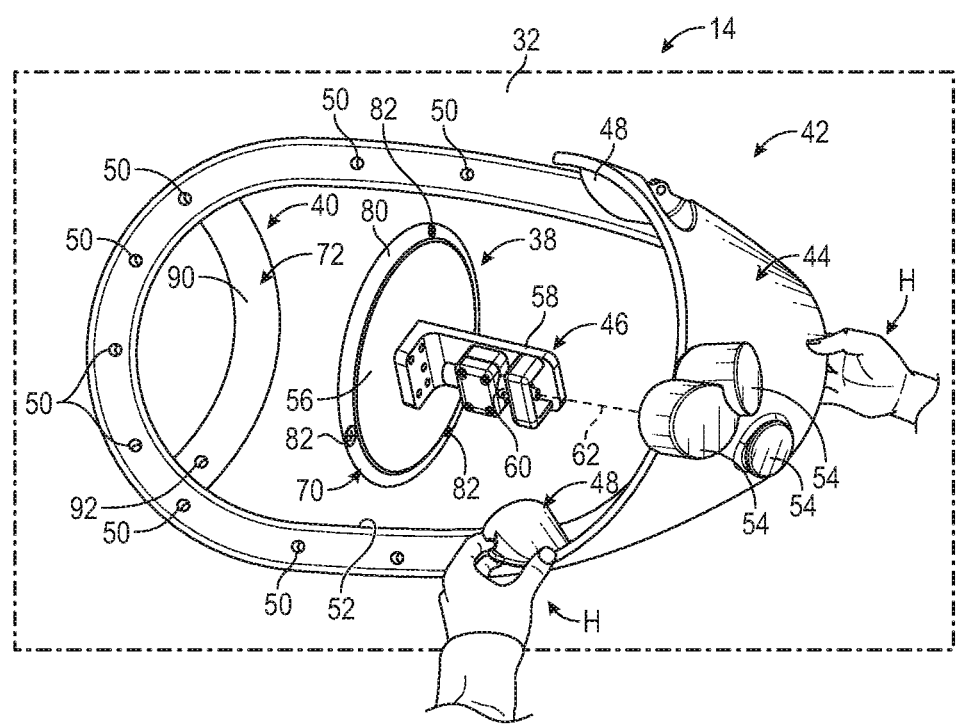
FIG. 3 is a perspective view of the disclosed laser alignment system, where the laser alignment system includes a laser alignment tool and an alignment bracket, according to an exemplary embodiment.

Referring generally to FIGS. 1-3, the runway turnoff lights 38 and the landing lights 40 emit extremely bright light, and therefore are not illuminated when individuals such as pilots and maintenance crew personnel are located within close proximity. This is to avoid having people's eyes exposed to the bright light that is emitted by the lights 38, 40. For example, in one embodiment, the landing lights 40 emit light that is rated at about 4,500 lumens. As a result, the lights 38, 40 are not illuminated when an individual aligns the lights 38, 40. Instead, the laser alignment system 42 is used to adjust a position of the respective mounting brackets 70, 72 (FIG. 2) that correspond to the lights 38, 40.

Although the present disclosure describes the laser alignment system 42 being used to adjust the position of exterior aircraft lighting, it is to be appreciated that the disclosure is not limited to an aircraft. Instead, the laser alignment system 42 may be used to align any lamp that emits high intensity light and as a result the lamp is not illuminated when individuals are within close proximity so as to protect their eyes.

Referring now to FIG. 3, the disclosed laser alignment system 42 includes an alignment bracket 44 and a laser alignment tool 46. FIG. 3 illustrates the alignment bracket 44 placed around an opening 52 disposed along the leading edge 32 of one of the wings 14. FIG. 3 also illustrates the landing light 40 and the runway turnoff light 38 removed from the aircraft 10, where the laser alignment tool 46 held in place by a mounting bracket 70 that corresponds to the runway turnoff light 38. The alignment bracket 44 includes a plurality of index features 48. Each index feature 48 of the alignment bracket 44 is configured to align with a mounting feature 50 disposed around the opening 52 located along the leading edge 32 of the wing 14. The lights 38, 40 are located within the opening 52 in the wing 14. In the embodiment as shown in the figures, the mounting features 50 are fasteners, however, other devices may be used as well. The index features 48 are configured to position the alignment bracket 44 along a surface, such as the leading edge 32 of the wing 14. As explained below, the alignment bracket 44 also includes one or more target features 54, where each target feature 54 corresponds to a unique mounting bracket for a lamp disposed along the leading edge 32 of the aircraft 10 (FIG. 1).

Figure 5:
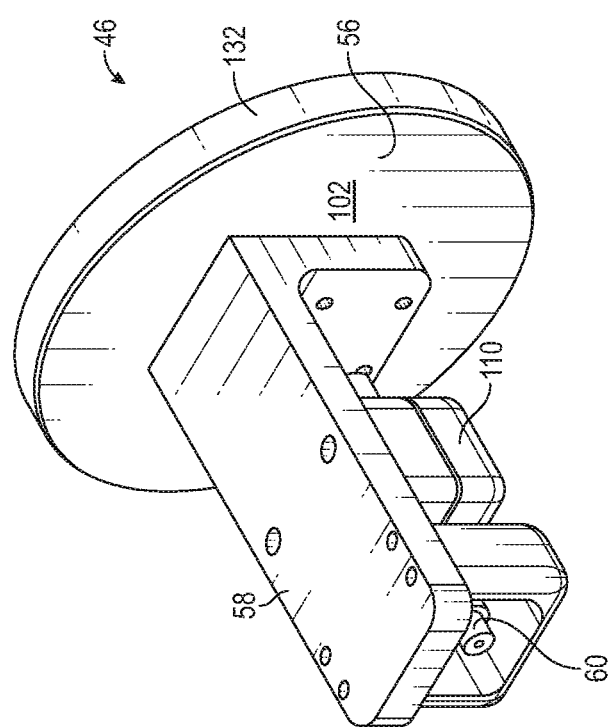
FIG. 5 is a perspective view of the laser alignment tool, according to an exemplary embodiment.
Figure 6:
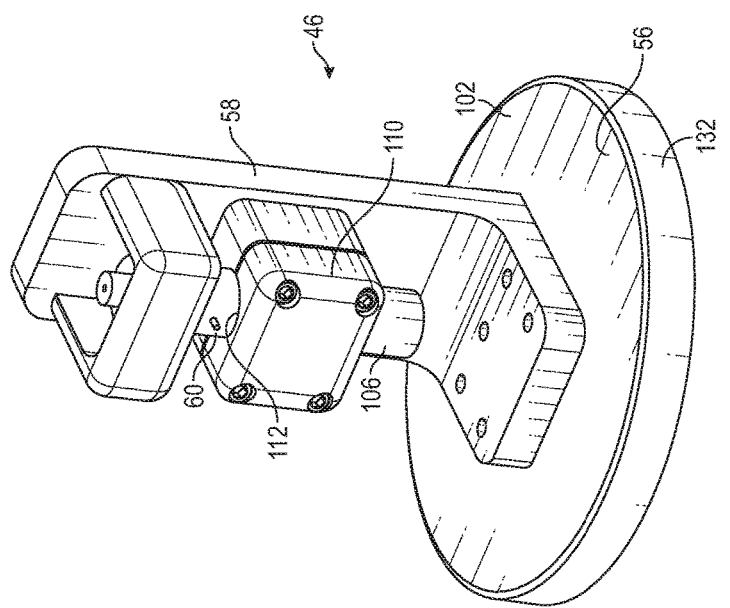
FIG. 6 is another perspective view of the laser alignment tool, according to an exemplary embodiment.

Referring to FIGS. 3, 5, and 6, the laser alignment tool 46 includes a base 56, a mount 58, and a laser device 60. The mount 58 of the laser alignment tool 46 secures the laser device 60 in place. The laser device 60 is configured to emit a laser beam 62 that is directed towards a corresponding one of the target features 54 of the alignment bracket 44. In one embodiment, the base 56 of the laser alignment tool 46 is shaped to fit within the mounting bracket 70 for the runway turnoff light 38, and the laser device 60 directs the laser beam 62 towards a corresponding one of target features 54 of the alignment bracket 44.

Figure 4:
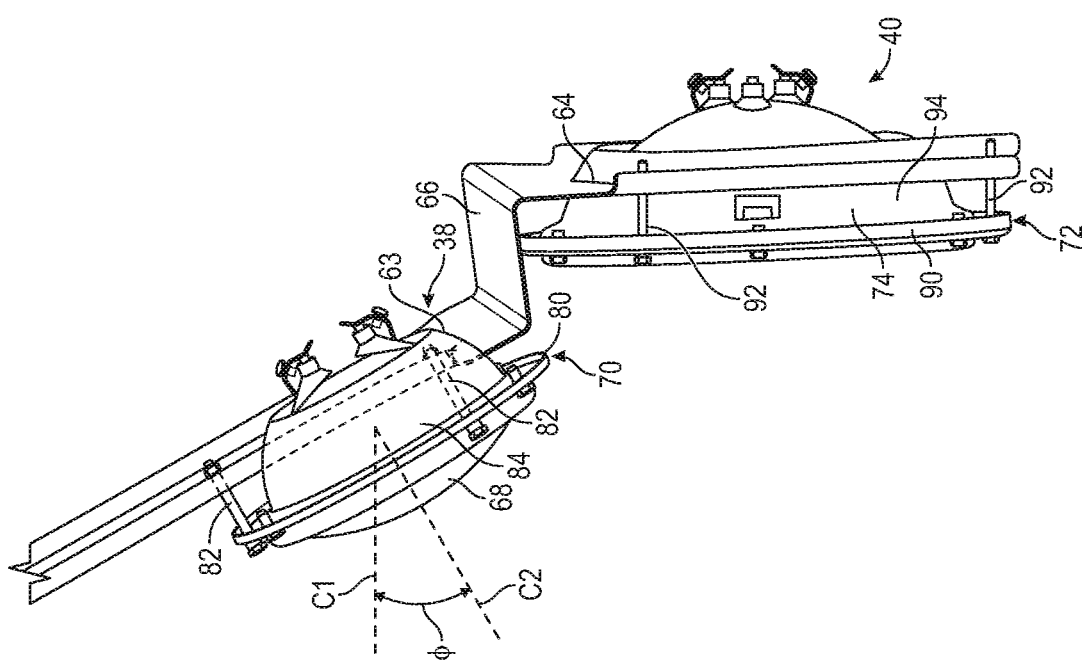
FIG. 4 illustrates the lamps corresponding to the landing light and the runway turnoff lights, where the lamps are each held in place by a corresponding mounting bracket, according to an exemplary embodiment.

FIG. 4 illustrates one of the runway turnoff lights 38 and one of the landing lights 40 installed within corresponding openings 63, 64 disposed along sheet metal 66 of the aircraft 10. The runway turnoff light 38 includes a lamp 68 that is held in place by the mounting bracket 70. Similarly, the landing light 40 also includes a lamp 74 that is held in place within the opening 64 of the sheet metal 66 by the mounting bracket 72. The mounting bracket 70 corresponds to the runway turnoff light 38, and includes a mounting ring 80 and a plurality of mounting pins 82. The mounting ring 80 of the mounting bracket 70 is shaped to hold a housing 84 of the lamp 68 of the runway turnoff light 38. Similarly, the mounting bracket 72 corresponding to the landing light 40 also includes a mounting ring 90 and a plurality of mounting pins 92, where the mounting ring 90 is shaped to hold a housing 94 of the lamp 74 of the landing light 40.

The lamp 68 of the runway turnoff light 38 is held in a predefined position by the mounting bracket 70, and the lamp 74 of the landing light 40 is also held in a corresponding predefined position by the mounting bracket 72. It is to be appreciated that the lamp 68 corresponding to the runway turnoff light 38 is oriented at a turnoff angle φ. Referring to FIGS. 1 and 4, the turnoff angle φ is measured with respect to a centerline C1 of the aircraft 10 and a centerline C2 of the lamp 68. As seen in FIG. 1, a right runway turnoff light (not visible in FIG. 1) is angled towards a right side R of the aircraft 10 and a left runway turnoff light (also not visible in FIG. 1) is angled towards the left side L of the aircraft 10. The runway turnoff lights 38 are each oriented at the turnoff angle φ to illuminate taxiways or obstacles that are located on the left and right sides of the aircraft 10.

Referring to FIGS. 2 and 4, a plurality of apertures 98 are disposed around the mounting ring 80 of the mounting bracket 70, and a plurality of apertures 100 are formed around the mounting ring 90 of the mounting bracket 72. The position of the lamp 68 is adjusted by rotating the mounting pins 82 either clockwise or counterclockwise within their respective apertures 98 of the mounting ring 80. Similarly, the position of the lamp 74 is also adjusted by rotating the corresponding mounting pins 92 either clockwise or counterclockwise in their respective apertures 100 within the mounting ring 90. In the exemplary embodiment as shown, the mounting brackets 70, 72 each include three mounting pins 82, 92 that are spaced equidistant from one another.

FIGS. 5 and 6 are perspective views of the laser alignment tool 46. In the embodiment as shown, the base 56 of the laser alignment tool 46 is round in shape to correspond with the mounting bracket 70 used to hold the lamp 68 in place (FIG. 4). The mount 58 of the laser alignment tool 46 is disposed along an upper surface 102 of the base 56, and projects outward with respect to the upper surface 102 of the base 56. The mount 58 is oriented perpendicular with respect to the upper surface 102 of the base 56. Accordingly, as seen in FIGS. 3, 5 and 6, the laser beam 62 emitted by the laser device 60 is oriented perpendicular with respect the upper surface 102 of the base 56 of the laser alignment tool 46.

In one embodiment, the laser device 60 includes an elongated body 106. In the example as shown in FIGS. 5 and 6, the body 106 of the laser device 60 includes a cylindrical profile, however the body 106 of the laser device 60 may include other profiles as well. The body 106 of the laser device 60 is held in place by an alignment feature 110 that is part of the mount 58. As seen in FIG. 6, the alignment feature 110 includes an aperture 112 that is shaped to receive a portion of the body 106 of the laser device 60. In an embodiment, the laser device 60 of the laser alignment tool 46 includes a battery (not shown in the figures) for providing power to the laser device 60. As a result, the laser alignment tool 46 does not require extension wires and is portable.

Referring now to FIGS. 3, 4, 5, and 6, the base 56 of the laser alignment tool 46 is shaped to correspond with the mounting ring 80 of the mounting bracket 70 (seen in FIG. 4) corresponding to the runway turnoff light 38. Referring specifically to FIG. 3, during the alignment process, the base 56 of the laser alignment tool 46 is placed within the mounting bracket 70 instead of the lamp 68. The laser beam 62 is directed towards a corresponding one of the target features 54 of the alignment bracket 44. Specifically, as explained below, each target feature 54 of the alignment bracket 44 corresponds to a unique mounting bracket that is part of the aircraft 10. An individual adjusts the mounting pins 82 disposed around the mounting ring 80 of the mounting bracket 70 until the laser beam 62 aligns with a target 180 that is defined by a pair of crosshairs 182 that are part of a corresponding one of the target feature 54 (shown in FIGS. 8A and 8B and described in greater detail below).

Figure 7:
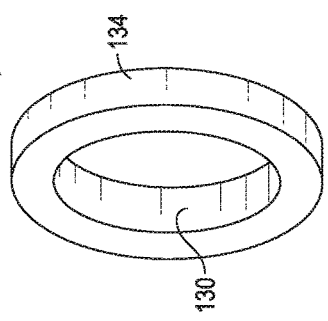
FIG. 7 illustrates an extension bracket that may be placed around a base of the laser alignment tool, bracket according to an exemplary embodiment.

FIG. 7 illustrates an extension bracket 128 for the laser alignment tool 46. Referring to FIGS. 6 and 7, the extension bracket 128 defines an inner annular surface 130 that corresponds to an outer perimeter 132 of the base 56 of the laser alignment tool 46, and an outer annular surface 134 that corresponds to the mounting ring 90 of the mounting bracket 72 corresponding to the landing light 40 (FIG. 3). It is to be appreciated that the base 56 of the laser alignment tool 46 is only shaped to correspond with the mounting ring 80 of the mounting bracket 70 corresponding to the runway turnoff light 38. However, as seen in FIG. 2, the mounting ring 90 of the mounting bracket 70 includes a diameter D2 that is greater than a diameter D1 of the mounting ring 90 of the mounting bracket 72. Thus, the extension bracket 128 is first removably attached around the outer perimeter 132 of the base 56 of the laser alignment tool 46, and then the base 56 is then placed within the mounting bracket 72 corresponding to the landing light 40.

Figure 8A:
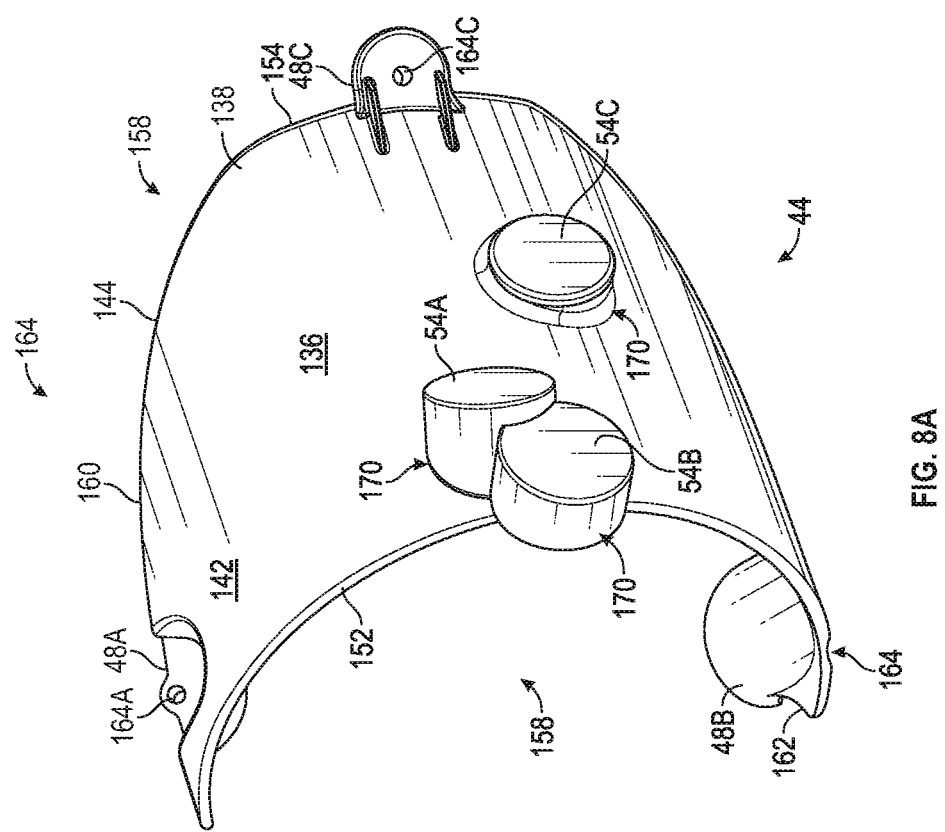
FIGS. 8A and 8B are perspective views of the alignment bracket, according to an exemplary embodiment.
Figure 8B:
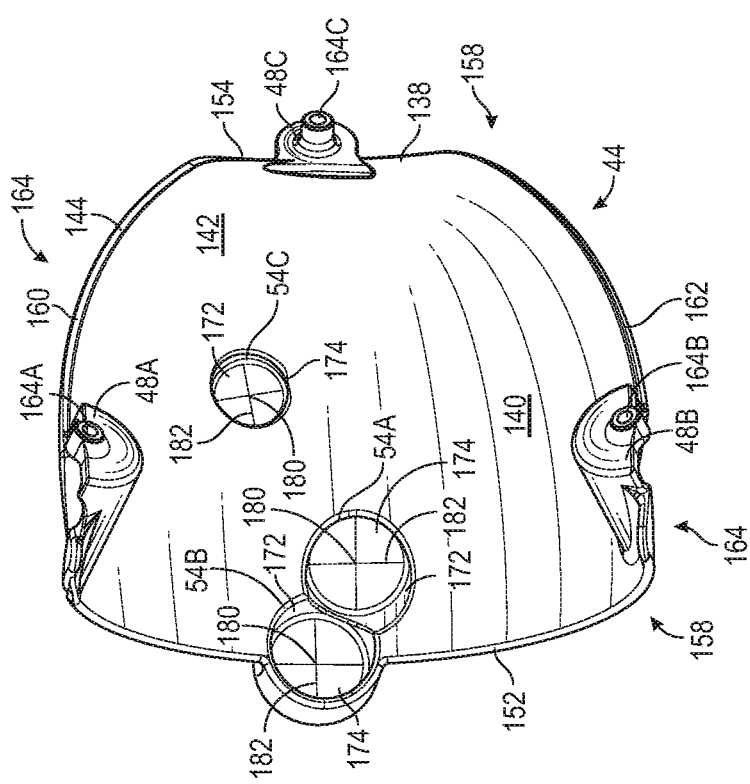

FIGS. 8A and 8B are perspective views of the alignment bracket 44. Specifically, FIG. 8A illustrates an outer surface 136 of a wall 138 of the alignment bracket 44, and FIG. 8B illustrates an inner surface 140 of the wall 138 of the alignment bracket 44. In the non-limiting embodiment as shown in the FIGS. 8A and 8B, the alignment bracket 44 includes three index features 48A, 48B, 48C and three target features 54A, 54B, 54C, however, it is to be appreciated that the figures are merely exemplary in nature. The alignment bracket 44 includes a body portion 142 that defines the index features 48A, 48B, 48C and the target features 54A, 54B, 54C.

In one non-limiting embodiment, the body portion 142 of the alignment bracket 44 is constructed by additive manufacturing methods, however, it is to be appreciated that other manufacturing methods may also be used as well. In an embodiment, the alignment bracket 44 is constructed of a relatively lightweight material such as, for example, a polymer. Thus, the alignment bracket 44 is portable and may easily be held and carried around by a single individual. For example, in the embodiment as shown in FIG. 3, an individual may hold the alignment bracket 44 in place against the opening 52 disposed along the leading edge 32 of the wing 14 using his or her hands H.

The body portion 142 of the alignment bracket 44 defines an outer perimeter 144. The plurality of index features 48A 48B, 48C are each disposed along the outer perimeter 144 of the alignment bracket 44. Specifically, the outer perimeter 144 of the body portion 142 of the alignment bracket 44 includes two linear segments 152, 154 that are each disposed on opposing ends 158 of the alignment bracket 44. The outer perimeter 144 of the alignment bracket 44 also includes two contoured segments 160, 162 disposed on opposing sides 164 of the alignment bracket 44.

Referring to FIGS. 3, 8A, and 8B, the contoured segments 160, 162 disposed around the outer perimeter 144 of the body portion 142 of the alignment bracket 44 are shaped to correspond with the opening 52 disposed around the lamps 68, 74. In the embodiment as shown in FIG. 3, the opening 52 is disposed along the leading edge 32 of the aircraft 10, the mounting features 50 are disposed around the opening 52, and the two contoured segments 160, 162 of the alignment bracket 44 are each shaped to correspond with the oval-shaped opening 52 disposed along the wing 14 of the aircraft 10. However, it is to be appreciated that the figures are merely exemplary in nature and the contoured segments 160, 162 of the alignment bracket 44 may include any type of shape. That is, the two contoured segments 160, 162 are shaped to correspond with the arrangement of the mounting features 50 disposed along the surface that the alignment bracket 44 mounts to (i.e., the leading edge 32 of the wing 14).

In the non-limiting embodiment as shown in FIG. 3, an individual holds the alignment bracket 44 in place against the opening 52 disposed along the leading edge 32 of the wing 14. Specifically, FIG. 3 illustrates an individual holding the alignment bracket 44 in place using his or her hands H. However, in an alternative approach, a clamping device or other fixture (not shown in the figures) may be used to hold the alignment bracket 44 in place. However, it is to be appreciated that if a clamping device is used, then the individual's hands H are free. Thus, only one individual may be needed to align the mounting brackets 70, 72 if the clamping device is used.

Referring to FIGS. 3, 8A, and 8B, the index features 48A, 48B, 48C each define a corresponding aperture 164A, 164B, 164C, where the apertures 164A, 164B, 164C are each shaped to receive one of the mounting features 50 disposed around the opening 52 of the leading edge 32 of the wing 14. Specifically, the index feature 48A is disposed along the contoured segment 160, the index feature 48B is disposed along the contoured segment 162, and the index feature 48C is disposed along the linear segment 154 of the alignment bracket 44.

It is to be appreciated that the outer perimeter 144 of the alignment bracket 44 is shaped to correspond with the opening 52 surrounding the exterior landing lights (i.e., the runway turnoff light 38 and the landing light 40) disposed along either the wing 14 on the left side L or wing 14 on the right side of the aircraft 10. In the example as shown in FIG. 3, the outer perimeter 144 of the alignment bracket 44 is shaped to correspond with the opening 52 disposed along the leading edge 32 of the wing 14 located on the left side L of the aircraft 10 (FIG. 1). The opening 52 includes an oval-shaped profile having a tapered end 158 (seen in FIG. 2) that is oriented towards the left side L of the aircraft 10.

A separate opening 52 is also disposed along the leading edge 32 of the wing 14 disposed along the right side R of the aircraft 10 (FIG. 1) as well. However, the tapered end 158 of the opening 52 disposed along the right side R of the aircraft 10 is oriented towards the right side R of the aircraft 10. In other words, the openings 52 disposed on the left side L and the right side R of the aircraft 10 are mirror images of one another. As a result, separate alignment brackets 44 are provided for the exterior lights disposed on the wing 14 on the right side R of the aircraft 10 and the exterior lights disposed on the wing 14 on the left side L of the aircraft 10.

Figure 8C:
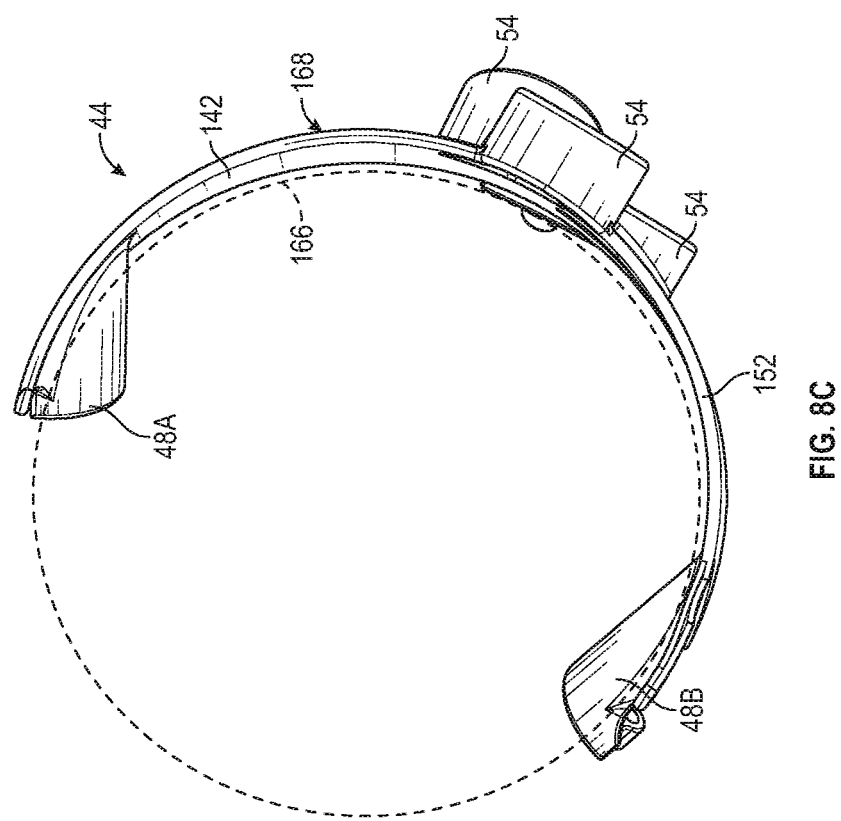
FIG. 8C is a side view of the alignment bracket, according to an exemplary embodiment.

Referring to FIGS. 8A and 8B, in the embodiment as shown, the linear segment 152 is longer in length when compared to the linear segment 154 of the alignment bracket 44. FIG. 8C illustrates the alignment bracket 44 when viewed along the linear segment 152 of the alignment bracket 44. The body portion 142 of the alignment bracket 44 includes a contoured profile 168. In the non-limiting embodiment as shown in FIG. 8C, when viewed along the linear segment 152 along the outer perimeter 144 of the alignment bracket 44, the contoured profile 168 is shaped to correspond to a portion of a cylinder 166 (shown in phantom line). However, it is to be appreciated that the figures are merely exemplary in nature and the contoured profile 168 of the body portion 142 of the alignment bracket 44 is not limited to a cylindrical shape. The body portion 142 of the alignment bracket 44 includes any contoured profile required to allow for a user to access and adjust the alignment bracket 44 during the installation process.

The target features 54A, 54B, 54C defined by the body portion 142 of the alignment bracket 44 shall now be described. Although the figures illustrate three target features 54A, 54B, 54C, it is to be appreciated that the alignment bracket 44 includes one or more target features 54. In the embodiment as shown in FIGS. 8A-8C, the alignment bracket 44 includes a plurality of target features 54A, 54B, 54C, where each target feature 54A, 54B, 54C corresponds to a unique mounting bracket 70, 72 (FIG. 4), and where each unique mounting bracket 70, 72 corresponds to a unique lamp 68, 74. For example, in the embodiment as shown, the target feature 54A corresponds to the mounting bracket 72 holding the lamp 68 of the runway turnoff light 38 (FIG. 2), the target feature 54B corresponds to the mounting bracket 72 holding the lamp 74 for the runway turnoff light 38, and the target feature 54C corresponds to another runway turnoff light disposed along the wing 14 on the left side L (FIG. 1) of the aircraft 10.

The target features 54A, 54B, 54C are each disposed along the wall 138 of the alignment bracket 44 and include a raised profile 170. In the exemplary embodiment as shown, the raised profile 170 of each target feature 54A, 54B, 54C defines a hollow cylindrical indentation along the wall 138 of the alignment bracket 44. However, the raised profile 170 of the target features 54A, 54B, 54C is not limited to a cylindrical indentation, and may include other configurations as well. Referring to FIG. 8B, the raised profile 170 of each target feature 54A, 54B, 54C defines a rounded side wall 172 and an end surface 174, where the end surface 174 of each target feature 54A, 54B, 54C is disposed along the inner surface 140 of the wall 138. In one embodiment, the end surface 174 of each target feature 54A, 54B, 54C includes the pair of crosshairs 182 that intersect with one another to define the target 180. Referring to FIGS. 3, 8A, and 8B, the laser beam 62 emitted by the laser device 60 is configured to align with the target 180 of the corresponding target feature 54A, 54B, 54C.

Although FIG. 8B illustrates a pair of crosshairs 182 intersecting one another, in another embodiment the crosshairs 182 may be omitted. Instead, a marking such as, for example, a bullseye may be used instead to indicate a location of the target 180.

The target 180 of each target feature 54A, 54B, 54C corresponds to a correct installation position for a respective one of the mounting brackets 70, 72 for each lamp 68, 74. When the mounting brackets 70, 72 are positioned in the correct installation positions, the lamps 68, 74 direct light towards a predefined area around the aircraft 10. For example, when the lamp 68 corresponding to the runway turnoff light 38 (FIG. 4) is in the installation position, the light emitted by the lamp 68 is directed along the turnoff angle φ.

Figure 9:
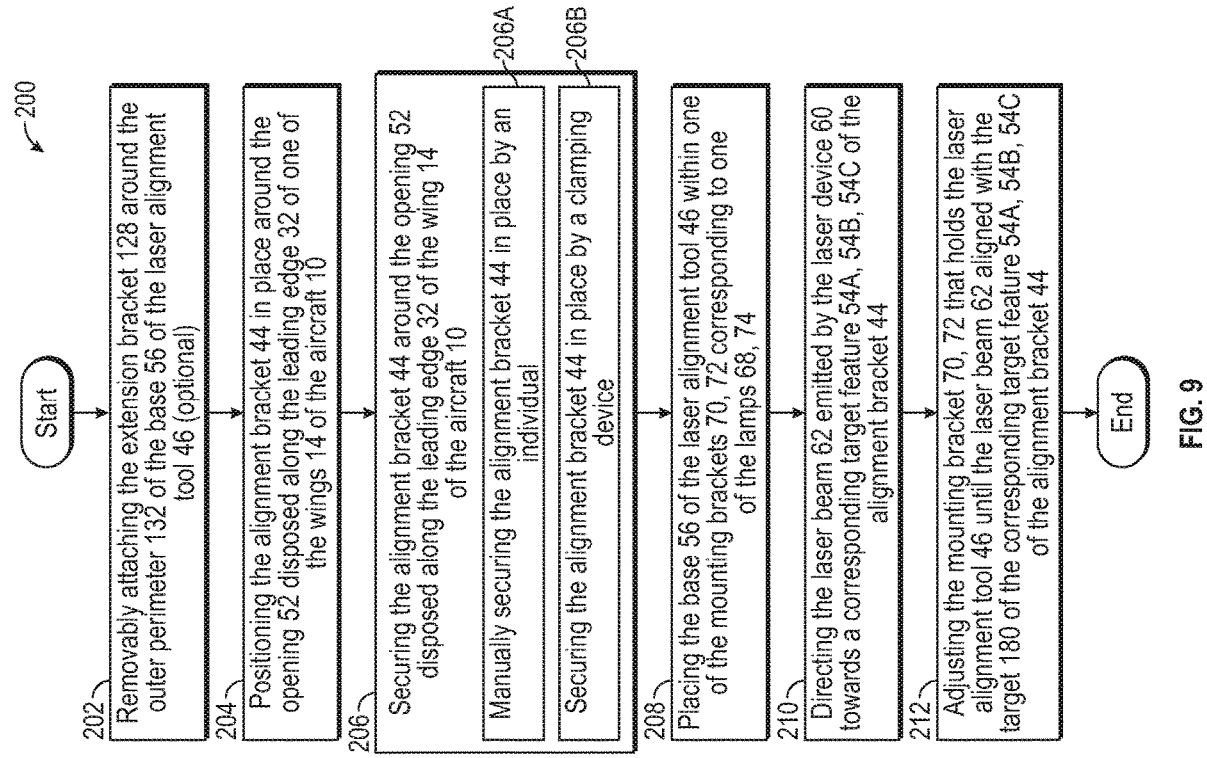
FIG. 9 is a process flow diagram illustrating a method for aligning the mounting bracket corresponding to a lamp disposed along a leading edge of the aircraft, according to an exemplary embodiment.

FIG. 9 is an exemplary process flow diagram illustrating a method 200 for aligning one of the mounting brackets 70, 72 corresponding to the respective lamps 68, 74 (FIG. 4) disposed along the leading edge 32 of the aircraft 10 (FIG. 1). Referring generally to FIGS. 1-9, the method 200 begins at block 202. It is to be appreciated that block 202 is optional, and is completed prior to placing the laser alignment tool 46 within one of the mounting brackets 70, 72. In block 202, the extension bracket 128 (FIG. 7) is removably attached around the outer perimeter 132 of the base 56 of the laser alignment tool 46 (FIG. 6). As mentioned above, the base 56 of the laser alignment tool 46 is only shaped to correspond with the mounting ring 80 of the mounting bracket 70 corresponding to the lamp 68 for the runway turnoff light 38. Accordingly, the extension bracket 128 is required if the mounting bracket 72 corresponding to the landing light 40 is aligned. The method 200 may then proceed to block 204.

In block 204, the alignment bracket 44 is positioned in place around the opening 52 disposed along the leading edge 32 of one of the wings 14 of the aircraft 10 by the index features 48A, 48B, 48C (FIGS. 8A-8B), where each index feature 48A, 48B, 48C of the alignment bracket 44 is configured to align with one of the mounting feature 50 disposed around the opening 52. The method 200 may then proceed to block 206.

In block 206, the alignment bracket 44 is secured around the opening 52 disposed around the leading edge 32 of the wing 14 of the aircraft 10. Referring to blocks 206A and 206B, the alignment bracket 44 is secured using one of two approaches. For example, in block 206A, the alignment bracket 44 is manually secured in place by an individual. For example, in the embodiment as shown in FIG. 3, an individual holds the alignment bracket 44 in place using his or her hands H. In block 206B, a clamping device or other fixture (not shown in the figures) secures the alignment bracket 44 in place. The method 200 may then proceed to block 208.

In block 208, the base 56 of the laser alignment tool 46 is placed within one of the mounting brackets 70, 72 corresponding to the lamps 68, 74 disposed along the leading edge 32 of the aircraft 10 (FIG. 1). The method 200 may then proceed to block 210.

In block 210, the laser beam 62 (FIG. 3) emitted by the laser device 60 is directed towards towards a corresponding target feature 54A, 54B, 54C of the alignment bracket 44, where the corresponding target feature 54A, 54B, 54C of the alignment bracket 44 includes a target 180 configured to align with the laser beam 62 emitted from the laser device 60 when the mounting bracket 70, 72 is in the correct installation position. The method 200 may then proceed to block 212.

In block 212, the mounting bracket 70, 72 that holds the laser alignment tool 46 in place is adjusted until the laser beam 62 (FIG. 3) emitted by the laser device 60 is aligned with the target 180 (FIG. 8B) of the corresponding target feature 54A, 54B, 54C. As mentioned above, the Referring generally to the figures, the disclosed laser alignment system provides various technical effects and benefits. Specifically, the alignment bracket of the laser alignment system is lightweight, portable, and is easy manipulated by a single individual. Therefore, only a single individual may be required to align a mounting bracket for a lamp corresponding to an exterior aircraft light. In contrast, conventional alignment systems typically require multiple individuals to align the mounting brackets for the exterior lighting on an aircraft. Furthermore, the disclosed alignment bracket is portable and is mounted directly to the aircraft. In contrast, conventional systems may require a tripod that includes a target, where the tripod rests upon the ground.

It is to be appreciated that the disclosed laser alignment system may be especially advantageous when used in aftermarket applications. This is because both the alignment bracket and the laser alignment tool are portable. It is to be appreciated that the mounting brackets that hold the landing lights and the runway turnoff lights are located high above the ground and may only be reached by lifting personnel up into the air using machinery, such as a hi-lift. As a result, some conventional systems may require multiple individuals working for about sixteen hours to align the landing and runway turnoff lights. However, the disclosed laser alignment system may only require one individual and may only require up to three hours to align the landing and turnoff lights.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A laser alignment system for adjusting a mounting bracket of a lamp, the laser alignment system comprising:
    an alignment bracket including a body portion defining one or more target features and a plurality of index features, wherein the one or more target features include a target that is configured to align with a laser beam and the plurality of index features that are configured to position the alignment bracket along a surface; and
    a laser alignment tool including a base, a mounting, and a laser device, wherein the mounting holds the laser device in place and the laser device is configured to emit the laser beam, and the base of the laser alignment tool is shaped to fit within the mounting bracket for the lamp and the laser device directs the laser beam towards a corresponding one of target features of the alignment bracket.

2. The laser alignment system of claim 1, wherein the alignment bracket includes a plurality of target features.

3. The laser alignment system of claim 2, wherein each target feature of the plurality of target features corresponds to a unique mounting bracket and each unique mounting bracket corresponds to a unique lamp.

4. The laser alignment system of claim 1, wherein the one or more target features of the alignment bracket are each disposed along a wall of the alignment bracket and include a raised profile.

5. The laser alignment system of claim 4, wherein the raised profile of each of the one or more target features of the alignment bracket define an end surface.

6. The laser alignment system of claim 5, wherein the end surface of each of the one or more target features of the alignment bracket includes a pair of crosshairs that define a target, and wherein the target is configured to align with the laser beam emitted from the laser device.

7. The laser alignment system of claim 1, wherein the body portion of the alignment bracket defines an outer perimeter, and wherein the plurality of index features are each disposed along the outer perimeter of the alignment bracket.

8. The laser alignment system of claim 1, wherein the body portion of the alignment bracket defines an outer perimeter, and wherein the outer perimeter of the alignment bracket includes two contoured segments disposed on opposing sides of the alignment bracket.

9. A laser alignment system for aligning exterior aircraft lighting disposed along a leading edge of a wing of an aircraft, the laser alignment system comprising:
    an alignment bracket including a body portion defining one or more target features, a plurality of index features, and an outer perimeter, wherein the one or more target features include a target that is configured to align with a laser beam, the plurality of index features that are configured to position the alignment bracket along a leading edge of the wing of the aircraft, and the outer perimeter of the alignment bracket is shaped to an opening surrounding an exterior landing light disposed along the leading edge of the wing; and
    a laser alignment tool including a base, a mount, and a laser device, wherein the mount holds the laser device in place and the laser device is configured to emit the laser beam, and the base of the laser alignment tool is shaped to fit within a mounting bracket for a lamp disposed along the leading edge of the wing, and the laser device directs the laser beam towards a corresponding one of target features of the alignment bracket.

10. The laser alignment system of claim 9, wherein the alignment bracket includes a plurality of target features.

11. The laser alignment system of claim 10, wherein each target feature of the plurality of target features correspond to a unique mounting bracket and each unique mounting bracket corresponds to a unique lamp disposed along the leading edge of the wing of the aircraft.

12. The laser alignment system of claim 9, wherein the one or more target features of the alignment bracket are each disposed along a wall of the alignment bracket and include a raised profile.

13. The laser alignment system of claim 12, wherein the raised profile of the one or more target features of the alignment bracket define an end surface.

14. The laser alignment system of claim 13, wherein the end surface of each of the one or more target features includes a pair of crosshairs that define a target, and wherein the target is configured to align with the laser beam emitted from the laser device.

15. The laser alignment system of claim 9, wherein the plurality of index features are each disposed along the outer perimeter of the alignment bracket.

16. The laser alignment system of claim 15, wherein the outer perimeter of the alignment bracket includes two contoured segments disposed on opposing sides of the alignment bracket.

17. A method for aligning a mounting bracket corresponding to a lamp disposed along a leading edge of a wing of an aircraft, the method comprising:

placing a base of a laser alignment tool within the mounting bracket corresponding to the lamp, wherein the laser alignment tool includes a laser device configured to emit a laser beam;

positioning an alignment bracket in place around an opening disposed along the leading edge of the wing of the aircraft;

directing the laser beam emitted by the laser device towards a corresponding target feature of the alignment bracket, wherein the corresponding target feature of the alignment bracket includes a target configured to align with the laser beam emitted from the laser device when the mounting bracket is in a correct installation position; and adjusting the mounting bracket that holds the laser alignment tool in place until the laser beam emitted by the laser device aligns with the target of the corresponding target feature of the alignment bracket.

18. The method of claim 17, further comprising:

securing the alignment bracket around the opening disposed along the leading edge of the wing of the aircraft.

19. The method of claim 18, further comprising:

manually securing the alignment bracket in place by an individual.

20. The method of claim 17, further comprising:

removably attaching an extension bracket around an outer perimeter of the base of the laser alignment tool prior to placing the base of the laser alignment tool within the mounting bracket corresponding to the lamp.

* * * * *